June 10, 1930.  S. DI BONO  1,762,681

CORK GRINDING MACHINE

Filed Jan. 26, 1928  5 Sheets-Sheet 1

June 10, 1930.　　　　S. DI BONO　　　　1,762,681
CORK GRINDING MACHINE
Filed Jan. 26, 1928　　　5 Sheets-Sheet 2
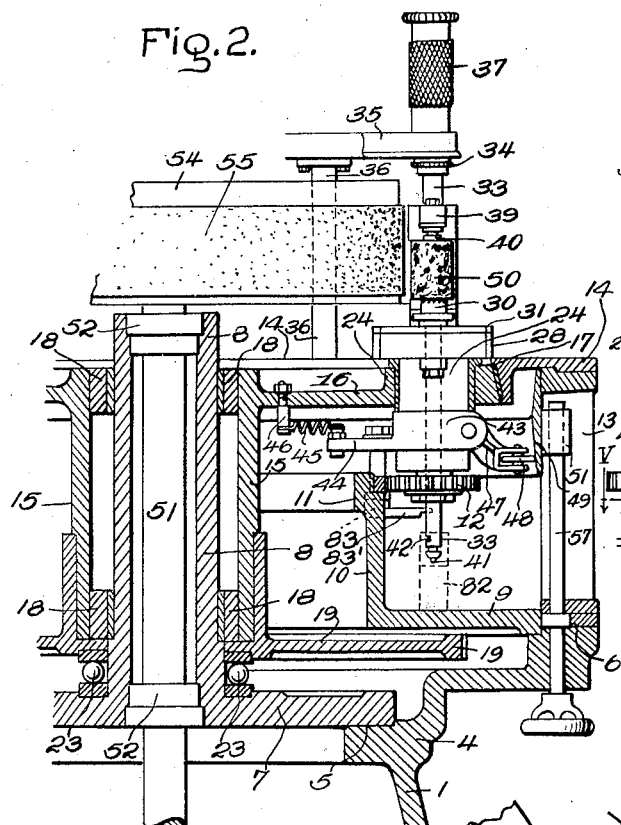
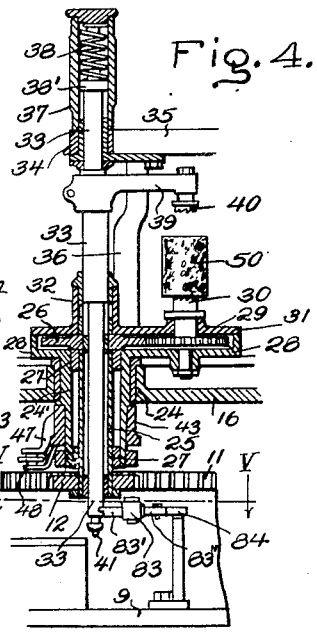
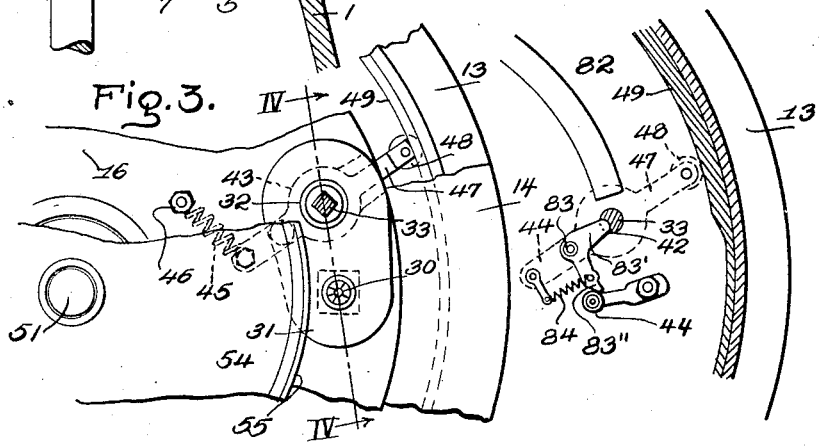
Inventor
Saverio Di Bono
By B. Singer
Attorney June 10, 1930.        S. DI BONO         1,762,681
CORK GRINDING MACHINE
Filed Jan. 26, 1928         5 Sheets-Sheet 3
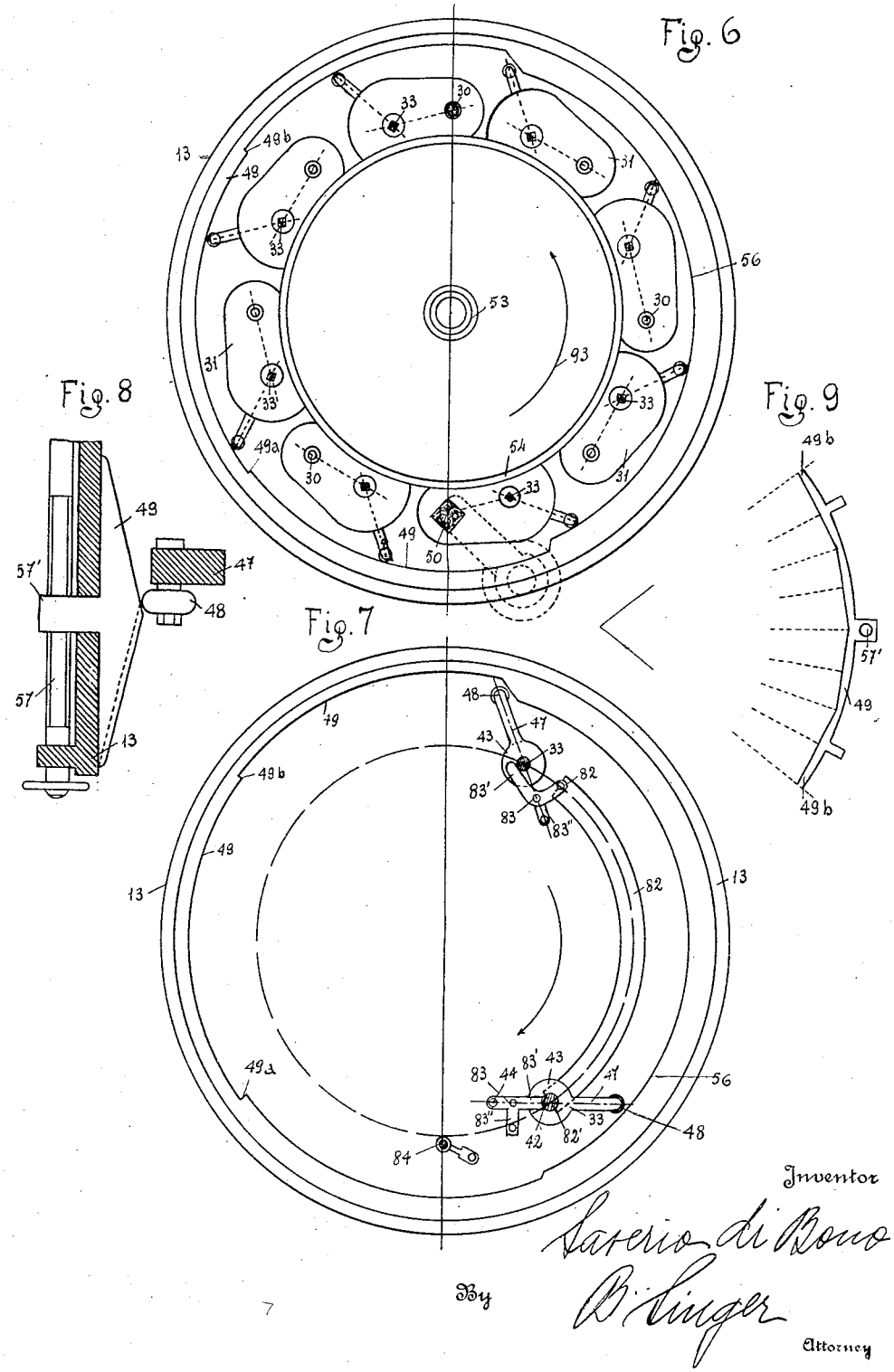

June 10, 1930.     S. DI BONO     1,762,681
CORK GRINDING MACHINE
Filed Jan. 26, 1928     5 Sheets-Sheet 4
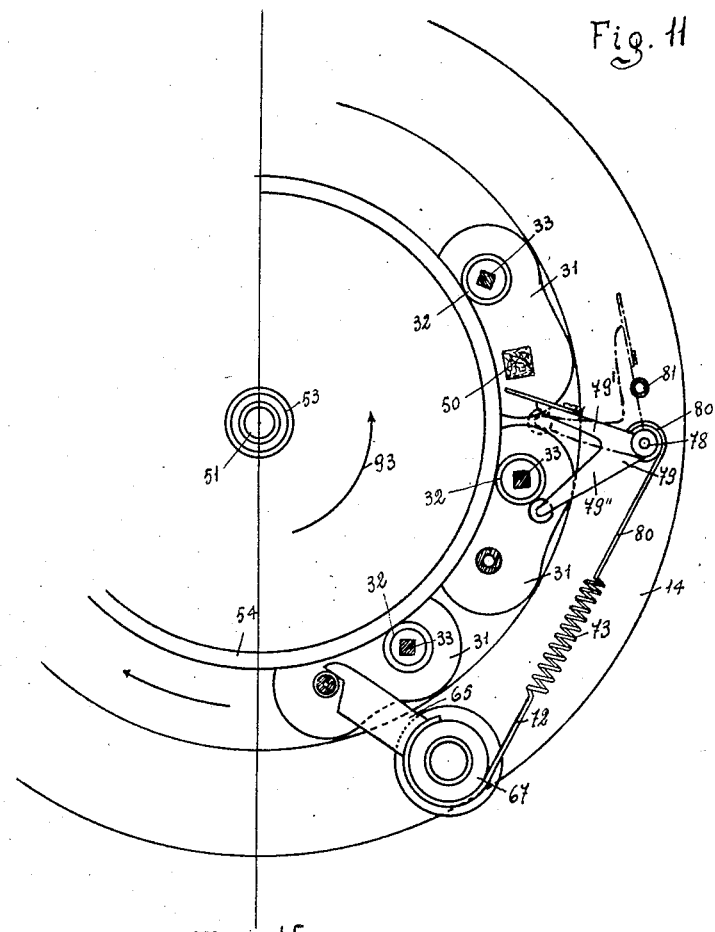
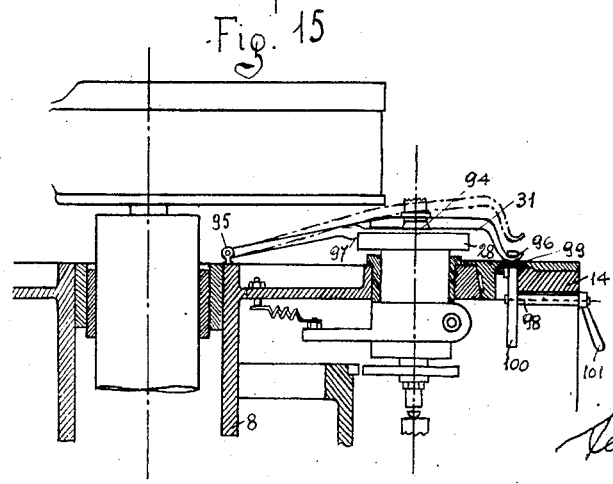
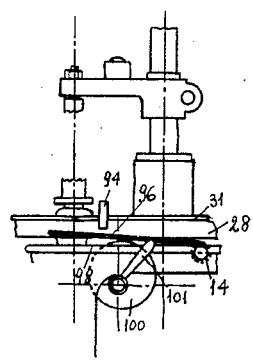
Inventor
Saverio di Bono
By D. Singer
Attorney June 10, 1930.　　　　S. DI BONO　　　　1,762,681
CORK GRINDING MACHINE
Filed Jan. 26, 1928　　　　5 Sheets-Sheet 5

Inventor
Saverio di Bono
By B. Singer
Attorney

Patented June 10, 1930

1,762,681

UNITED STATES PATENT OFFICE

SAVERIO DI BONO, OF GENOA, ITALY

CORK-GRINDING MACHINE

Application filed January 26, 1928. Serial No. 249,708.

This invention relates to an improved cork-grinding machine and its object is to provide a machine of this kind working parallelepipedal small cork blocks into stoppers of every current type, say of round, or quadrangular section with rounded edges, and either of uniform section or also suitably tapering.

The principal object of the invention is to provide an improved machine of this kind, capable of producing cork-stoppers of every dimension, giving a maximum of production by a minimum of working costs.

Another object of the present invention is to provide a machine minimizing waste corks and requiring no skilled attendants, as the contrivances combined into the improved cork machine according to the invention are of utmost reliability.

A further advantage of the invention is to provide a machine in which the working parts are all protected, and further in which means are provided to avoid that the cork dust may float into the air and be aspired by the workmen, which is very unhealthy.

These and other objects are attained by the improved machine according to the invention comprising substantially a number of vertical cork-holding mandrels or turning jaws arranged in spaced relation around a central axis; the said jaws revolving about the said central axis while spinning around their own one, the angular speed of the turning jaws as related to the revolutions of the machine, being equal for all of the mandrels.

The cork block is held between one of the said mandrels and a coacting piece, forming what will be shortly termed jaws of the "cork lathes" the said cork lathes being mounted so as to be easily brought a suitable distance apart of the common axis of revolution, thus coming into or out of contact of the emery band or cylindrical surface co-axial with the said central axis and rotatable at a suitable angular speed and in an appropriate direction around the said axis.

The approaching of the cork jaws and corks therein against or apart from the emery band is governed by a cam, suitably shaped according to the type of corks to be worked.

The invention further comprises the combination with the said devices of suitable means for feeding raw cork blocks, of suitable size, with relation to the size of the stoppers to be produced, and of suitable ejecting means for the finished corks.

An embodiment of the invention is described hereinafter by way of example and with reference to the accompanying drawings, in which:

Figure 2 is a vertical section to enlarged scale and with parts broken away through the working parts of the machine and particularly showing one of the cork lathes;

Figure 3 is a fragmentary view, to same scale as the former, of a plan of the device shown in Figure 2; with parts broken away;

Figure 4 is a vertical fragmentary view taken on line IV—IV of Figure 3, viewed in the direction of the arrows;

Figure 5 is a horizontal section taken on line V—V of Figure 4;

Figure 10:
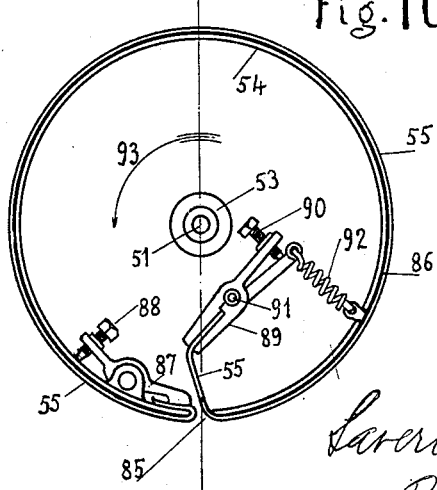
Figure 12:
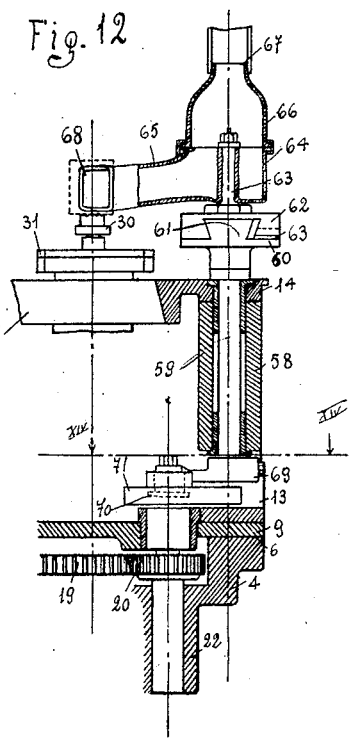
Figure 13:
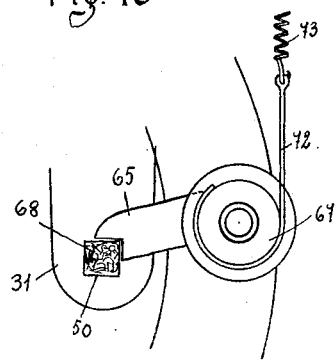
Figure 14:
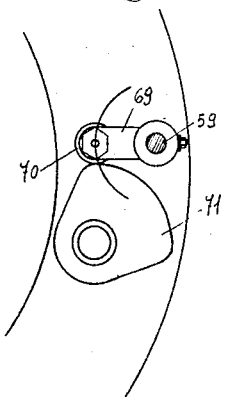

Figure 6 diagrammatically shows a top view of the lathe system of a machine and controlling cams therefor, with parts broken away;

Figure 7 diagrammatically shows in plan the controlling cams and coacting devices at the beginning and the end of the cork grinding;

Figure 8 diagrammatically shows a vertical section through a controlling cam and its registering device;

Figure 9 is a plan view of a piece of polygonal controlling cam as required for producing quadrangular corks;

Figure 10 diagrammatically shows the method adopted for fastening the emery band on to the grinding drum;

Figure 11 diagrammatically shows a plan view of the means for feeding the parallelepipedal blocks and for expelling the finished cork stoppers;

Figure 12 shows a fragmentary vertical section through the feeding device and its governing means;

Figure 13 is a diagrammatical top view of the device shown in Figure 11;

Figure 14 is a horizontal fragmentary view on line XIV—XIV of Figure 12; and

Figures 15 and 16 diagrammatically show respectively a vertical section and a side elevation of the clutch means for the cork lathes and controlling devices for disconnecting same even when the machine is working.

The supporting stand for the working mechanism consists of a foot or sock 1 cast in one piece and comprising a base 3 for fastening to the floor, lateral sides leaving large inspecting openings 2 between each pair of upright sides, that support a circular plate 4 centrally recessed as in 5, so as to provide for two parallel supporting surfaces, the one 5' remaining below and centrally of the other 6. The lower supporting plate 5' carries a metallic disc 7 fixed thereto by suitable bolts and centrally provided with an upwardly projecting vertical sleeve 8 serving as a pivot for the revolving parts of the mechanism.

On to the outer annular zone a suitable metallic disc 9 is fastened, the said disc being centrally made with a large opening and having attached a vertical sleeve 10 projecting upwardly. The upper border of said sleeve 10 carries outwardly a toothed crown 11 in mesh with the single pinions 12 controlling the spinning of the individual cork lathes.

Externally of the said circular zone 6, and above the border of disc 9 is fixed by suitable means a cylindrical body 13 suitably apertured for the purposes as will be seen hereinafter. On the upper annular border of the said cylindrical body 13 a metallic annular cover is arranged so as to protect the internal parts, serving also as supporting means for the feeding and ejecting mechanisms and for other purposes. On to the fixed sleeve 8 is rotatably journalled a cylindrical body 15 formed in one piece with or having otherwise fixed to its upper end a circular disc 16 with slightly tapering edges 17 and running into contact with the internal complementary surface of the annular crown 14. The said cylindrical body 15 pivoted on sleeve 8 and supported on suitable bearings 18, has keyed to its lower end a large plate gear 19 in mesh with a pinion 20 driven by the governing shaft of the mechanism by means of a vertical shaft 21 guided in a supporting bearing 22 forming part of a circular plate 4 of the base 1 of the machine.

The whole of the block comprising the cylindrical body 15, the upper disc 16 and the lower large gear 19, in its revolution about the sleeve 8 bears on a thrust ball-bearing 23 supported on the fixed disc 7.

The upper disc 16 is cast with as many vertical holes 24 as there are cork lathes in the machine, the said cylindrical holes being arranged, in spaced relation, with their centers along a circumference concentrical to sleeve 8. Through each of the said holes 24, suitably bored to the purpose, a rotatable sleeve 24' is mounted, forming the supporting bearing for the whole of the corresponding lathe.

The construction of the individual cork lathes is as follows: (Figures 2, 3, 4 and 5) within rotatable sleeve 24' another cylindrical sleeve 25 is mounted, that carries above of sleeve 24' a plane gear 26, and below of the said sleeve 24' a pinion 12 meshing with a fixed toothed crown 11. Sleeve 25 is of course guided and supported in the sleeve 24' with interposed bearings 27. Sleeve 24' bears upwardly of the plane disc 16 an elongated casing 28 that, while containing the gear 26 supports also a pinion 29 meshing therewith and supporting by means of its vertical boss the lower lathe element or rotating jaw 30.

A suitable cover 31 closes the upper end of casing 28, while supporting the upper bearing for the shaft of the turning jaw 30. The cover 31 has on its upper side a vertical sleeve 32 which is below and coaxial with the sleeve 24'. Within said sleeve is secured a square-bored hub in which is slidably arranged a square stem of a vertical rod 33 which has a lower cylindrical portion passing through the sleeve 25 coaxially therewith and projecting downwardly of the corresponding pinion 12. Rod 33 is again cylindrical at its upper end and is mounted easily slidable in a guide-sleeve 34 fixed in an annular supporting member 35 on to which the like guide sleeves for the remaining lathe members of the whole device are likely mounted. This annular supporting member 35 is in its turn supported on suitable pillars 36 fixed to the upper annular crown 14 of the machine. In line with sleeve 34 on the supporting member 35 an up-set cylindrical cup 37 is fastened, the said cup containing a helical spring pressing downwardly through a small piston 38' on to the head of bar 33. On the square section of rod 33 a transverse arm 39 is adjustably mounted, the said arm 39 being provided at its outer end with a vertical bore in which a chuck member is mounted for free rotation, said chuck member 40 being coaxial and coacting with the lathe member 30.

The lower cylindrical part of rod 33 ends downwardly with a rotatable knuckle ball joint 41 and is laterally grooved as at 42, for the purpose as will be seen hereinafter.

Externally of sleeve 24' a collar 43 is tightened, formed with a radial outwardly projecting arm 44, the free end of which is connected to a helical spring 45 fastened by its other end to a pivot 46 integral of disc so that the tension of the said spring tends to rotate sleeve 24' and the whole of the device supported by it all around its axis, so as to set the common axis of jaw 30 and counter-jaw 40 towards the center of the machine.

Diametrically opposite to arm 44 another arm 47 is formed integral with collar 43, said arm having its end forked and provided with a roller 48 bearing by tension of spring 45 against a controlling cam 49 fixedly mounted internally of the cylindrical body.

From the foregoing it is apparent that when gear 19 is rotated by pinion 20 driven by shaft 21, the disc 16 will also rotate and carry around all of the sleeves 24' solidary thereto and therefore also pinions 12 will turn by way of their meshing with the fixed toothed crown 11, thus controlling, through sleeves 25, the rotation of pinions 26 and 27 meshing therewith and finally the rotation of supporting jaws 30.

Now, assumed a cork block 50 to be placed on each supporting jaw 30 and to be held in place by the rotatable member 40 of the holding jaw that is lowered to position shown in Figure 2 by means of spring 38 pressing against its supporting rod 33, also the cork block 50 will be rotated.

Through central sleeve 8, co-axially of the machine, a vertical shaft 51 passes, the said shaft being rotatably mounted in suitable ball bearings 52 and suitably supported at its lower end by a proper lower thrust ring. This shaft 51 has mounted upwardly horizontal pulley or drum 54 having its outer cylindrical rim surface lined with a suitable strip of emery paper or cloth, serving for the filing of the corks. Said pulley is rotated by shaft 51 from the main driving shaft of the machine, as will be better seen hereinafter.

Anyway it should be remarked that the direction of rotation is contrary to that of the cork blocks 50 and the driving ratio should be properly chosen for the most efficient working of the machine and avoiding excessive wear and tear.

Springs 45 tend to press corks 50 against the emery band 55, but the shaped cams 49 regulate the distance of the said emery surface from the cork sides, and thus according to the different type of corks to be produced, different shaped cams 49 are employed, their shape being generally that shown in Figures 2, 6, 7, 8 and being adapted to produce cylindrical or tapering corks of circular or quadrangular section, rounded at the edges, and of different sizes.

With reference especially to Figures 6 and 7 showing a machine having eight cork lathes or pairs of spinning jaws, there may be firstly remarked the arrangement of a fixed cam 56 of constant thickness both radially and axially and having internally a projection suitable for bearing every cork block, even of maximum section, within the limits of corks as workable by the machine, out of contact of the emery pulley, so as to suspend every work. This fixed cam 56 occupies in the machine of the type as described the two-fifths of a circumference and corresponds to the ejecting periods of the finished products and the feeding of the raw products. The remaining three-fifths of the internal circumference of the cylindrical body 13 are occupied by cam 49 formed as a circular annulus of triangular isosceles section and adapted to slide axially against the said internal surface of body 13 so as to control a suitable number of screw-threaded rods 57 provided with a hand wheel and screwed into corresponding sleeves 57' externally fixed to the cam and slidable along vertical grooves cut into the body 13. The said cam 49 may be formed in one piece, or also may be formed of several parts, and generally three, connected together, the first of these parts extending, in the direction of rotation, of the machine, from the end of the fixed cam 56 until section 49$^a$, say for that fifth of a turn in which its triangular section is of greater height; the second section, from 49$^a$ to 49$^b$ extending for another fifth of circumference, of like regular triangular section, projecting outwardly less than the former one and the third section, from section 49$^b$ to the end of the fixed cam 56 occupying the remaining fifth of a circumference, this latter part being of constant triangular section only for the upper part, while the lower triangular section varies circumferentially following a polygonal equilateral shape, as that shown in Figure 9. Thus, according to the height position of cams 49, rollers 48 on arms 47 will roll either on the upper parts of constant section or on the lower parts, the last of which is of variable section, and will bring the corks nearer or farther against the grinding surface, according to whether the rollers bear against the borders or towards the central part of the said cams. Therefore the upper part thereof serves for the working of cylindrical corks of circular section of different diameters, while the lower part serves for the working of quadrangular corks with rounded edges.

The ratio between the radii of the fixed toothed crown 11 and of pinions 12 is such as to permit the cork to make a complete turn on its axis for each of the cam segments as described, providing the passage from 56 to 49$^a$ to a first rough fashioning by its passage from 49$^a$ to 49$^b$ being provided for a finer grinding and through the last segment from 49ᵇ to the fixed cam the complete finish. During the two successive revolutions of pinions 12, i. e. in correspondence of the segment corresponding to the fixed cam 56, the corks are ejected and new cork blocks are fed.

Figure 1:
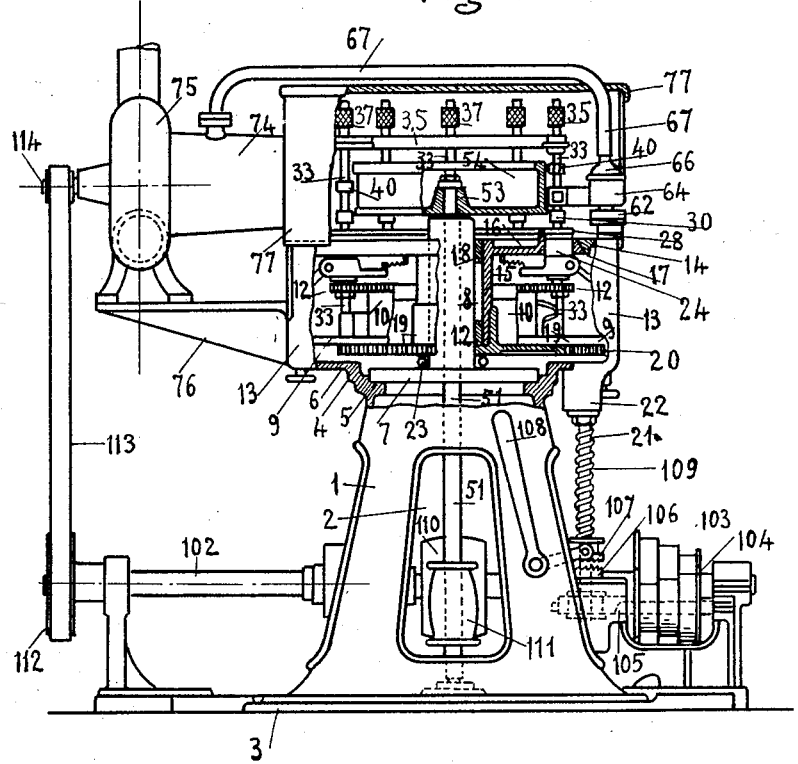
Figure 1 is a front view of an elevation of the cork working machine according to the invention, parts being in section for a better illustration.

These operations are effected by the devices specially shown in Figures 11, 12, 13 and 14, with reference to Figure 1. Between the bottom of the cylindrical body 13 and the annular crowning plate 14 a vertical shaft 59 is suitably supported in bearings 58. To the upper end of this shaft 59 a disc 60 is keyed provided at its upper face with a diametrical dovetail key-projection 61, serving for joining thereto a plate 62 provided with corresponding groove and consequently mounted so as to be allowed to be displaced radially on the said disc, and to be fixed at the desired position by a suitable clamping screw 63. Plate 62 carries a cylindrical box 64 fixed to its upper face through a suitable central vertical pin 63', this box being laterally provided with a hollow arm of rectangular section 65 and upwardly closed by a cover that is partly cylindrical and closed by a dome 66 ending as an open tube for rotatably threading the open end of a flexible tube 67, as will be better seen hereinafter.

The hollow arm 65 projecting from box 64 ends with a mouth 68 of right angular outline viewed in plan, the dimension of the mouth being less than the area of two adjacent side faces of the smallest of the cork blocks to be fed. The arm 65 is of such a length as to provide for the small blocks that are maintained against the mouth 68 by air pressure being placed, by a suitable rotation of the arm, exactly centrally of supporting jaw 30, when this latter comes under the said mouth. The little differences due to the different sizes of the corks are balanced by suitable displacements of plate 62 on disc 60, the said adjusting being effected each time a new cork size should be produced.

The lower end of shaft 59 has keyed thereto an arm 69 bearing through a roller 70 against a cam 71 horizontally keyed on an extension of shaft 21 above pinion 20 and disc 9. The said roller 70 is held against the cam surface 71 by a suitable draw-ribbon 72 coiled on the cylindrical part of a casing 64 and tending to uncoil by action of a spring 73 to be better spoken of hereafter.

Cam 71 comprises two circular contact surfaces of different diameters and joined together by straight sides suitably rounded at their joints so as to form a fair surface. The amplitude of the above arcs of circle are such as to properly govern an angular swinging of arm 69 and of arm 65, mechanically connected thereto, comprising two stop points, in correspondence of the circular surfaces, and one of these stops corresponding to the time of placement of the block, at the beginning, and the other time, at the end, for allowing a sufficient time in order the cork supported on jaw 30 may be angularly shifted of a sufficient amount to interfere nowise with the return of arm 65.

The tube 67, which is generally flexible, is connected by its other end to the suction port 74 of an air pump or extractor 75 fastened on to a suitable supporting bracket 76 integral of the machine and suitably driven from the driving shaft. This pump draws air through conduit 74 connected by its other end to the casing 77, preferably of transparent material and sheltering the upper part of the machine, and serves both for sucking up the cork dust formed during the working and to produce and maintain the necessary vacuum within the tube 67, chamber 64, and communicating hollow arm 65 this vacuum serving for sucking up the quadrangular cork 50 and maintaining it adherent to the mouth 68, whenever the attendant puts same near the said mouth. But this vacuum, though being sufficient to hold the block adherent to the end of arm 65, during its angular movement to the corresponding supporting jaw 30, is anyway such as to permit of an easy detaching of the cork block as soon as this is placed on the holding jaw and held down by the upper jaw 40.

Onto the annular crown 14 in a suitable position a vertical pivot 78 is fixed on which is rotatably mounted a bell crank lever 79, which constitutes substantially the ejecting device of the finished corks. One of the arms 79' of said lever, is provided at its end with a spring leaf, while the other arm 79" ends with a vertically pivoted roller. On the cylindrical hub of lever 79 a draw ribbon 80 is coiled having its outer end connected to an end of a helical spring 73 having its other end connected to draw ribbon 72 coiled onto the cylindrical member 67.

The whole is so arranged that the spring 73 tends to rotate both the feeding and the ejecting mechanism, but in reverse directions, and it remains always in tension whatever the angular positions of the said devices may be. The angular movement of the ejector is outwardly limited by a pin 81 fixedly mounted to crown 14, this pin forming a stop for the arm 79' of lever 79. The relative length of arms 79" and the angle enclosed therebetween are such as to permit of the roll of arm 79" being within the path of movement of any one of jaw hubs 32 while lever 79 is abutting against pin 81 and thus comes into contact with said hub which causes an angular displacement of said lever 79. This displacement is of such a width as to cause arm 79' to be brought in front of cork 50 on the supporting jaw of the next cork lathe. During this displacement spring 73 receives a greater tension, inasmuch as the said movement is contemporary with to the inwardly rotation of the feeder. Thus when by a further rotation of the machine the roller on arm 79'' leaves the hub 32, the lever 79 is suddenly drawn outwardly and arm 79' with its end-spring comes off against the finished cork 50 which, as being freely supported will be ejected off the machine and collected in suitable baskets.

It will be seen therefore that the expulsion of the finished corks is completely automatic, while the feeding is made by hand, as more suitable also in view of casting off unsuitable cork pieces and furthermore this operation is of such a simplicity as to be easily accomplished by any most unskilled person.

From the foregoing it is apparent that the feeding and ejecting operations will be perfectly effected only if the corks are fed to and expelled from the lathe jaws at right times. This timing is controlled by the device to be now described with particular reference to Figures 2, 3, 5 and 7. As already said, the rods 33 supporting the holding jaws 40 are allowed to slide axially and are always pressed downwardly by springs 38. During the whole time of working of the corks the said rods are free to slide and meanwhile the holding jaws 40 press down the corks against the supporting surface of jaws 30. When the cork is finished, say when it is at an angular position corresponding to the beginning of the fixed cam 56 and for a determined arc of circle, a cylindrical segment 82 is mounted concentrically of the axis of the machine, on the fixed plane 9. The radius of this cylinder is equal to the distance of the axes of rods 33 from the center of the machine and its upper face is inclined so as to pass from a minimum height at 82' corresponding to the minimum lowering of the ends 41 of rods 33, and the maximum height at 82 corresponding to the maximum raising of the said end 41 on the plane 9; in order the cork may be put free. The angular position and the amplitude of the said cylindrical segment 82 are such as to permit of the ball end 41 of each rod 33 coming into contact with the upper surface thereof immediately when the cork has been finished, say when roller 48 on arm 47 comes into contact with the fixed cam 56 and goes out of contact when rod 33 has reached its uppermost position.

On arm 44 of collar 43 controlling the angular movements of the corresponding lathes an angular pawl 83 is pivotally mounted, an arm 83' of which bears against the free end of the rod 33 while the other 83'' is pressed by a spring 84 connected by the opposite end to the arm 44 and maintains the pawl arm 83' by spring pressure against the said rod 33.

As already said, in the lower end of the rod 33 is out a groove 42 that remains exactly in correspondence with the end of arm 83' of the pawl 83 when rod 33 is in its uppermost position. Consequently when rod 33 is arrived by action of segment 82 to the said position, the end of the arm 83' of the pawl 83 enters the slot 42 and remains therein by action of a stop (not shown) serving to limit the angular movement. By this way the rod 33 is stopped in its upper position. All these operations take place a little time before the expulsion of the finished cork from the lathe, that thus arrives at the feeding position void and with its rod 33 stopped in raised position.

When a raw cork has been fed, the arm 83'' of pawl 83 abuts against a roll stop 84 fixed in suitable position on plate 9 and, owing to the consequent angular displacement of pawl 83 its arm 83' comes out of the slot 42 and thus rod 33 falls down at once by action of a spring 38 thus holding the cork. Thus all the necessary operations for a precise and easy feeding, working and ejecting are effected.

The side or grinding surface of drum 54 is cylindrical when corks of constant section should be obtained, while the surface should be conical when tapering corks should be produced. In either case the preferred structure is that shown in Figure 10, the said drum being with the upper bottom open, its peripheral zone or rim being interrupted in a point 85.

This rim surface is firstly lined with a soft fabric 86 such as billiard cloth or the like and on this cloth an emery band 55 is applied by inserting its ends in the slot 85. One of the said ends of the grinding strip is inwardly bent and pressed against the internal face of the drum 54, by means of a clamping device controlled by a lever 87 fixed to the rim and abutting thereagainst by means of a suitable screw 88, the other strip-end being clamped between two suitable clamping jaws 89 controlled by a suitable screw 90 and rotatable about its pivot 91 fixed to the drum. A spring pulls angularly the said clamp 89 so as to pull inwardly the strip 55.

The drum rotates in the direction of the arrow 93 and the device above described has for its purpose to recover always every slackening of the strip 55 during the working of the machine, while leaving a certain amount of elasticity that is necessary in order to avoid a tearing up and a rapid wear.

In order to allow a temporary suspension of the movement of the working parts of the machine, a special clutch device is provided, that is particularly described hereafter with reference to Figures 15 and 16. As generally known, it is often required to stop the working part of a machine without stopping the whole machine, and in the case considered especially with relation to the registering of some of the working parts and controlling cams. In correspondence of each one of the lathes, and precisely between each one of the rods 33 and the supporting block 30 a lever 94 is radially arranged pivoted by one of its ends to sleeve 8 and slightly curved so as to pass above the cover 31 of casing 28, and ending outwardly as a slide 96 bearing against the annular crown plate 14 of the machine. Between its ends lever 94 is provided with a downwardly projecting tooth 97 that can come within a slot in the internal border of cover 31. When the lever is down, as shown in full lines Figure 15, the casing is encountered by tooth 97 in its nonworking position, whilst when the said lever is in the raised position as indicated by dotted lines, casing 28 is free to move and the working of the corks can take place.

In suitable position of the annular crown 14 and in correspondence of sliders 96 of levers 94, a recess 98 is bored into which a small plate 99, hinged to one of its ends is allowed to move. This plate by means of an eccentric cam 100 fastened to the machine and rotatable by means of a handle 101 can be raised above the plane 14 and brought at level therewith. It will be understood that if plate 99 is placed in the position in which, by way of having ended the fixed cam 56 the casing 28 is pulled towards the center of the machine, this displacement of the casing 28 takes place before the corresponding lever 94 falls down and therefore, when, after having passed the said plate 99 lever 94 falls again down, its tooth 97 will be on the cover 31 and will not hinder the movements of casing 28, thus permitting the cork grinding but, if plate 99 is down, the lever 94, previously raised by the outward movement of casing 28 will soon fall down so as to let the tooth 97 to be a hindrance for the return movement of the casing, thus suspending the grinding of the small blocks.

Therefore during the ordinary grinding it will be sufficient to maintain plate 99 raised, in order the work takes place regularly. The falling down of plate 99 will correspond to a stopping of the grinding by the machine, though being the driving devices and annexed members in movement.

The device is driven through a countershaft 102 (Figure 1) driven in its turn by suitable driving means, or being directly connected to a motor. This counter shaft 102 through a suitable conus of pulleys 103 drives at a suitable speed a reciprocal conus 104, forming together a system of speed change. This second conus 104 is keyed on a secondary horizontal shaft 105 driving through a suitable helical gear, and worm 106 the vertical shaft 21 for the purposes as hereinbefore set forth. On the said shaft 21 suitable teeth clutch 107 is mounted, controlled by lever 108 supported by the machine frame 1, and the working of which can be eased by a spring 109 coiled around shaft 21. This clutch serves for disconnecting shaft 21 and stops the movement of the lathe supporting platform, without stopping the remaining movements.

The countershaft 102 drives further through pulley 110 and crossed belt the pulley 111 keyed on shaft 51 of the drum tool 54 and through pulley 112 and belt 113 drives pulley 114 governing the air pump 75.

Thus, as it is apparent, all of the movements of the machine are dependent upon one another though a certain amount of autonomy being allowed, by the use of belt drives.

From the foregoing specification the working of the device is generally clear: The attendant places the cork blocks successively in correspondence of the mouth to the end of the feeder arm while this latter after having effected its movement towards the abutting member rests in its position as its controlling arm bears against the minor circular surface of cam 71. The small block soon adheres to the feeder mouth by way of the internal depression formed within the arm by the air pump 75, and is carried by the corresponding arm centrally of the supporting lathe jaw. Just then, by action of the described mechanism, rod 33 and its holding-jaw 40 are at once brought against the supported cork block that thus remains gripped between the two jaws, leaving the feeder mouth. At this point commences the revolution of the corresponding cork-bearing lathe that revolves about the machine axis while spinning around its own one, and successively coming always nearer to the central grinding tool, thus assuming step by step the desired shape by way of the controlling cams. Finally, by way of the fixed cam it is brought apart from the tool, the holding jaw rod is raised, freeing the block that can be expelled to the right moment and completely finished, while its supporting jaw is again ready for taking a new raw cork.

It is clear that any number of cork jaws, cams, etc. could be adapted on the same machine, without departing from the spirit of the invention.

I claim:

1. A cork grinding machine comprising: a base of a frustoconical shape; a plane disc fastened to the said base and centrally bearing an upwardly projecting cylindrical sleeve; a cylindrical sleeve on to the said external fixed sleeve and rotatable around same, suitably supported by the fixed disc; an annular horizontal disc on the said rotatable sleeve and a horizontal gear below same; a pinion meshing with said gear and driven by the governing shaft of the machine; a number of spaced vertical sleeves concentrically of the machine; a horizontal casing of elongated shape fitted with a suitable cover mounted on the said vertical sleeve and excentrically thereof; a second sleeve rotatably mounted within said rotatable sleeves and carrying downwardly, under the rotatable supporting sleeve a pinion and above, within the elongated casing another pinion meshing with another like pinion contained and pivoted within the said casing, the pivot axis being excentrical with regards to the sleeve axis; said pivot projecting above the said casing in form of a supporting jaw, a vertical rod internally of each rotatable sleeve, the said rod being axially slidable, but solidary in its rotation to the rotatable sleeve, the said rods projecting from both sides, say below the sleeve and above the casing; a spring pushing said rod downwardly; a horizontal arm transversally of each of the vertical rods and carrying to its free end a cylindrical boss rotatable about its vertical axis, that is co-axial with the axis of the supporting jaw, and having a head adapted to coact to hold the cork; a plane annular disc to the upper part of the supporting shell and carrying on a central sleeve a fixed toothed crown in mesh with all of the pinions below the said cylindrical sleeves; a vertical shaft centrally of the machine and supporting upwardly, in correspondence of the spaced jaws a drum like tool with its rim lined with emery fabric; each rotatable sleeve within the annular disc being downwardly provided with a collar, two arms radially attached to said collar and outwardly projecting thereof; one of the said arms being pulled centrally of the machine by a suitable spring, while the opposite arm bears with its end roller against the internal surface formed as cylindrical cams concentrically of the machine; and controlling the oscillation of the arms; and means for the timely feeding of the raw corks and for the ejecting of the finished ones; means being also provided for the suitable driving of the various parts, for the inspecting and cleaning and for registering the machine according to the type of corks to be obtained.

2. A machine of the type described in which the feeding device comprises a hollow cylindrical chamber with dome cover; a hollow arm connected to said casing and ending with an angular mouth; adapted to be perfectly closed by two adjacent side faces of any size of cork block adapted to be ground by the machine the said cylindrical chamber being vertically mounted on a horizontally oscillatable platform radially adjustable on a vertical shafting fastened to the foot of the machine and a controlling cam for swinging said supporting platform and to make it stand still for some time at each end of the swinging arc; means for driving said cam from the same vertical shaft for rotating the lathe carrying plate; an air pump; a tube connected to the suction port of the pump and having its other end threaded on a projecting bushing communicating with the interior of the rotatable chamber; and a pulling ribbon coiled around the said cylindrical chamber and attached to a tension spring, the position of the chamber and the length being such as to let at one end of the swinging arc that the cork block axis coincides with that of the supporting jaw to be charged, while the other arm position being the most suitable for the hand feeding.

In witness whereof I affix my signature.
SAVERIO DI BONO.